(12) United States Patent
Seck et al.

(10) Patent No.: US 12,261,734 B2
(45) Date of Patent: Mar. 25, 2025

(54) SYSTEMS AND METHOD FOR INFORMING INCIDENT RESOLUTION DECISION MAKING

(71) Applicant: Capital One Services, LLC, McLean, VA (US)

(72) Inventors: Mohamed Seck, McLean, VA (US); Louis Buell, McLean, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 26 days.

(21) Appl. No.: 17/670,855

(22) Filed: Feb. 14, 2022

(65) Prior Publication Data
US 2023/0261933 A1    Aug. 17, 2023

(51) Int. Cl.
| | | |
|---|---|---|
| *H04L 41/0654* | (2022.01) | |
| *G10L 15/18* | (2013.01) | |
| *H04L 41/5074* | (2022.01) | |
| *H04L 43/045* | (2022.01) | |
| *H04L 43/0817* | (2022.01) | |

(52) U.S. Cl.
CPC ......... *H04L 41/0654* (2013.01); *G10L 15/18* (2013.01); *H04L 41/5074* (2013.01); *H04L 43/045* (2013.01); *H04L 43/0817* (2013.01)

(58) Field of Classification Search
CPC ............. H04L 41/0654; H04L 41/5074; H04L 43/045; H04L 43/0817; G10L 15/18
See application file for complete search history.

(56) References Cited

U.S. PATENT DOCUMENTS

| | | |
|---|---|---|
| 9,406,023 B2 | 8/2016 | Bogojeska et al. |
| 10,535,002 B2 | 1/2020 | Gupta et al. |
| 10,877,946 B1 | 12/2020 | Silva et al. |
| 10,985,994 B1 | 4/2021 | Mahadik et al. |

(Continued)

OTHER PUBLICATIONS

International Search Report and the Written Opinion of the International Searching Authority issued in related PCT Application No. PCT/US2023/012992 mailed Apr. 17, 2023, 13 pages.

(Continued)

*Primary Examiner* — Joseph L Greene
(74) *Attorney, Agent, or Firm* — HUNTON ANDREWS KURTH LLP

(57) ABSTRACT

An automated system is provided for facilitating resolution of an incident. An incident information data processor is configured to receive incident information and an action estimation data processor is configured to receive critical action information that includes a description of an action and an action initiation time. The action information data processor obtains previous action information on actions taken to resolve previous incidents and determines an estimated action outcome and an estimated critical action time interval for resolution of the critical action using the critical action information and the previous action information. An incident estimation data processor is configured to determine an overall estimated time interval for incident resolution and an estimated incident resolution time. An incident display data processor is configured to transmit, to a user data processing system for display to a user, at least the estimated incident resolution time.

20 Claims, 10 Drawing Sheets

(56) References Cited

U.S. PATENT DOCUMENTS

| | | |
|---|---|---|
| 11,003,518 B2 | 5/2021 | Lopez et al. |
| 11,327,826 B1* | 5/2022 | Shama .................. G06N 20/00 |
| 2007/0067773 A1 | 3/2007 | Hope et al. |
| 2008/0098109 A1 | 4/2008 | Faihe et al. |
| 2018/0307756 A1 | 10/2018 | Garay |
| 2019/0266064 A1* | 8/2019 | Srinivasan .......... H04L 41/5074 |
| 2019/0268214 A1* | 8/2019 | Maes ...................... G06F 18/24 |
| 2019/0347282 A1 | 11/2019 | Cai et al. |
| 2020/0097879 A1 | 3/2020 | Venkata et al. |
| 2020/0192743 A1* | 6/2020 | Harper ................ G06F 11/0793 |
| 2020/0293946 A1 | 9/2020 | Sachan et al. |
| 2020/0336506 A1* | 10/2020 | Levin ...................... G06F 40/30 |
| 2021/0397497 A1 | 12/2021 | Tiwari et al. |
| 2022/0038351 A1* | 2/2022 | Jasionowski ....... H04L 41/5019 |
| 2022/0207295 A1* | 6/2022 | Stanevich ........... G06F 18/2185 |
| 2022/0318617 A1* | 10/2022 | Wong .................... G06N 20/20 |
| 2022/0405315 A1* | 12/2022 | Mahindru .............. G06F 16/345 |
| 2023/0064625 A1* | 3/2023 | Patti .................... G06F 11/0793 |

OTHER PUBLICATIONS

Notification concerning Transmittal of International Preliminary Report on Patentability issued in related PCT/US2023/012992, mailed Aug. 29, 2024, 8 pages.

\* cited by examiner

SYSTEMS AND METHOD FOR INFORMING INCIDENT RESOLUTION DECISION MAKING

RELATED APPLICATIONS

The subject matter of this application is related to that of U.S. application Ser. Nos. 17/670,829, 17/670,876, 17/670,904, and 17/670,919, which are filed concurrently herewith, and the complete disclosures of all of which are incorporated herein by reference.

FIELD OF THE INVENTION

This disclosure relates generally to automated system incident resolution and, more particularly, to systems and methods for using historical incident data to estimate the effects of on-going and anticipated actions on the expected time required to resolve an incident.

BACKGROUND OF THE INVENTION

When an incident occurs in a highly complex enterprise environment technology system, the urgency to resolve the problem may result in many technological and human resources being brought to bear, some of which are duplicative or inappropriate for the problem. Even when the proper resources are involved, there is often difficulty in identifying critical information and assuring that it is distributed where it is needed. Monitoring and managing the efforts of disparate operatives and operations during an incident is extremely difficult and efficiency is often sacrificed for the sake of obtaining a speedy resolution. Key to the success of such management efforts are the ready availability of and regular updates to information about actions taken in furtherance of resolution and the ability to anticipate the likely impact of such actions.

SUMMARY OF THE INVENTION

An illustrative aspect of the invention provides an automated system for facilitating resolution of an incident occurring on a digital processing system. The automated system comprises an incident information data processor, an action estimation data processor, an incident estimation data processor, and an incident display data processor. The incident information data processor is configured to receive incident information about the incident from at least one of the set consisting of the digital processing system, a monitoring system in communication with the digital processing system, and a user data processing system. The action estimation data processor is configured to receive critical action information for a critical action. The critical action information includes a description of the action and an action initiation time. The action estimation data processor is further configured to obtain previous action information from a historical database of information on previous incidents. The previous action information includes information on actions taken to resolve the previous incidents. The action information data processor is also configured to determine an estimated action outcome and an estimated critical action time interval for resolution of the critical action using the critical action information and the previous action information. The incident estimation data processor is configured to determine an overall estimated time interval for incident resolution and an estimated incident resolution time. The incident display data processor is configured to transmit, to the user data processing system for display to a user, at least the estimated incident resolution time.

Another aspect of the invention provides an automated method of facilitating resolution of an incident occurring on a digital processing system. The method comprises receiving, by a resolution facilitation server, incident information for the incident and critical action information associated with a critical action taken to further resolution of the incident. The critical action having an expected outcome and the critical action information including an action initiation time. The method further comprises determining, by the resolution facilitation server, the critical action from the critical action information, an estimated critical action time interval for resolution of the critical action using the critical action information and historical information for previous similar actions, and an estimated critical action resolution time using the action initiation time and the estimated critical action time interval. The method still further comprises applying, by the resolution facilitation server, a machine learning model to determine expected additional actions required to resolve the incident based on the incident information and the expected outcome of the critical action. The method also comprises determining, by the resolution facilitation server, an estimated additional action time interval for each expected additional action and an overall estimated time interval for incident resolution and an estimated incident resolution time. The resolution facilitation server may then transmit at least the estimated incident resolution time to a user processing device for display to a user.

Another aspect of the invention provides an automated system for facilitating resolution of an incident. The system comprises a primary user data processing system having a primary user interface device configured for presenting information to and receiving information from a primary user and a plurality of secondary user data processing systems each having a secondary user interface device configured for presenting information to and receiving information from one of an associated one of a plurality of secondary users. The system further comprises a data storage unit having stored therein a historical database of information on initiation and resolution of critical actions taken to further resolution of previous incidents and an action estimation data processing system. The action estimation data processing system comprises an action estimation data processor, an incident estimation data processor, and an incident display data processor. The action estimation data processor is configured to receive critical action information for a critical action taken in furtherance of incident resolution. The critical action information includes an action initiation time. The action estimation data processor is also configured to determine an estimated critical action time interval for resolution of the critical action using the critical action information and information from the historical database. The incident estimation data processor is configured to determine an overall estimated time interval for incident resolution and an estimated incident resolution time. The incident display data processor is configured to construct a graphical representation of an incident timeline indicating the action initiation time, an estimated critical action resolution time, and the estimated incident resolution time, and to transmit the graphical representation to each of the primary and secondary user data processing systems for display.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

In enterprise scale technology systems dealing vast numbers of data streams there may be thousands of opportunities for service disruptions every hour. Large investments are made in monitoring systems to assure early detection and automated response for mitigation of problems. Regardless of such efforts, the complexity of such systems guarantees that there will be incidents that cannot be resolved solely by automated systems and the causes of which are not immediately apparent. Such incidents may trigger a response procedure that involves immediate gathering of personnel resources to evaluate and propose solutions to the problem. In many cases, this may involve the establishment of a bridge call or videoconference to which responders may be called to join. Bridge discussions may be recorded to allow for post-incident evaluation of resolution procedure. The resolution effort and the bridge call are typically run by one or more incident managers who are charged with assuring the right personnel are involved and with action assignment and evaluation.

Incident managers are highly dependent on the information and recommendations provided by personnel on the call. Because there may literally be hundreds of team members on the call, however, it may be extremely difficult to assure that the best action proposals are being heard. There may be too much or too little information and there may be conflicting information and proposals from different organizations. The result may be a tendency to throw many potential solutions at the problem simultaneously, with many different team members taking actions independently and without cross-pollination of information.

Embodiments of the present invention provide an incident resolution system that helps incident managers make decisions on critical actions to be taken in furtherance of resolution. This is accomplished by leveraging historical information on previous incidents through the use of machine learning. The system also helps managers control information and make more efficient use of human and technology resources.

Figure 1:
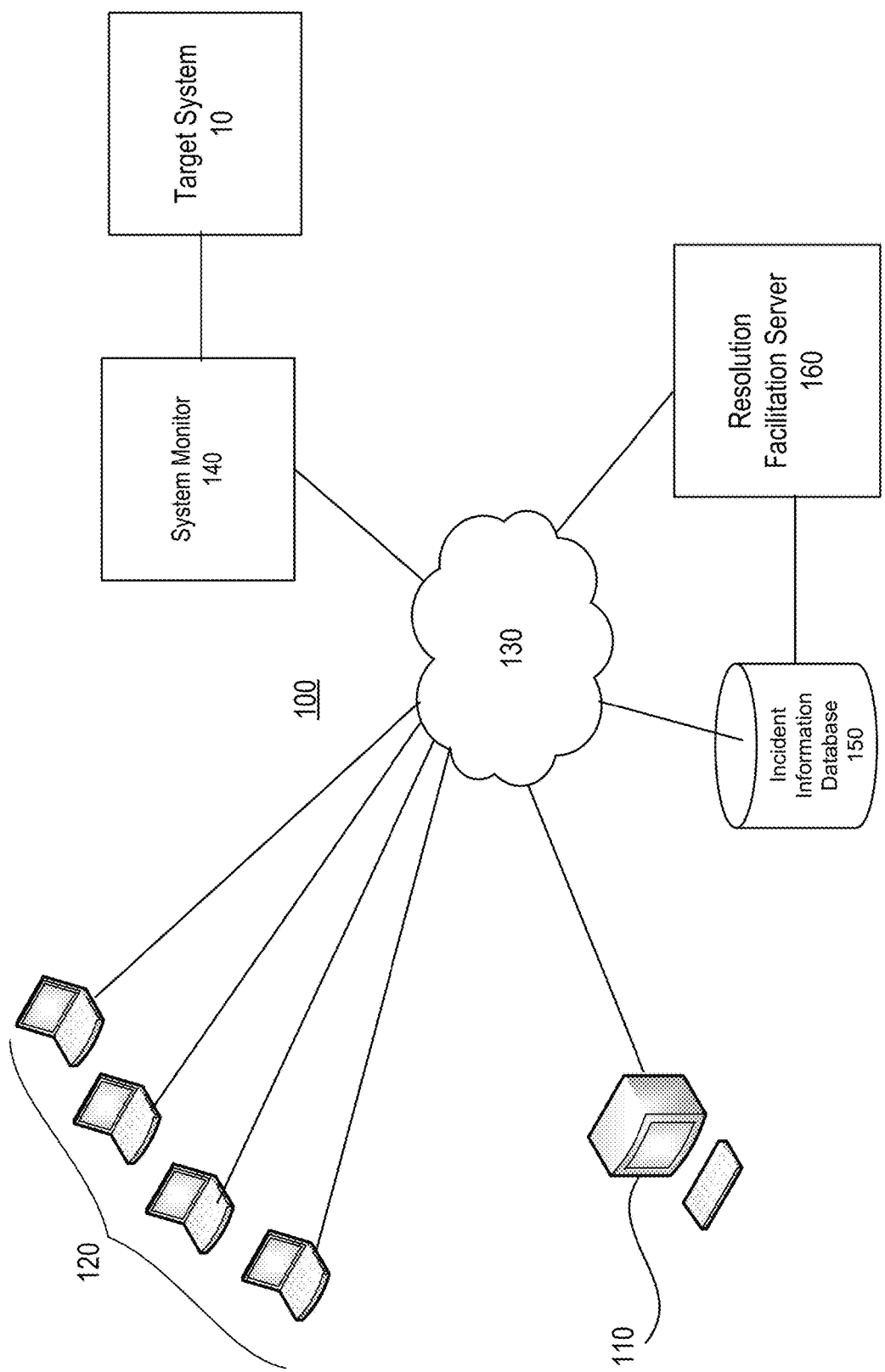
FIG. 1 is a schematic representation of an incident resolution system according to an embodiment of the invention.

With reference to FIG. 1, an incident resolution system 100 according to an example embodiment may include an incident manager (primary) data processing system 110 and one or more incident team member (secondary) data processing systems 120 in communication with one another via a network 130. As will be discussed, the incident manager data processor 110 may be configured for receiving information from and providing information to an incident manager. The team member data processing systems may each be configured for receiving information from and providing information to an individual incident resolution team member. All of these systems may be connected to one another via the network 130 through the use of collaboration software. Any or all of the incident manager system 110 and the team member systems 120 may also be configured to initiate and/or monitor the results of actions in furtherance of resolving a system incident.

The resolution system 100 may also include or may be in communication with a system monitor 140 configured for monitoring and providing information on operations of a target system or object 10. The system monitor 140 is, in particular, configured to determine whether the target system or object 10 has experienced or is experiencing a service failure or other incident. As used herein, a system incident may be any instance where the monitored system 10 is in a measurably undesirable state (e.g., a system or component has crashed or suffered a hardware failure, an application has a memory leak or a performance issue, etc.). The system monitor 140 may be further configured to obtain diagnostic and other operating information for the monitored system 10 and communicate to appropriate recipient systems via the network 130.

The resolution system 100 includes a resolution facilitation server ("RFS") 160 that is configured for receiving information from any or all of the incident management system 110, the team member systems 120 and the system monitor 140 via the network 130. The RFS 160 may include or be in communication with an incident information database 150 that has stored therein historical information on previous system incidents and the actions taken in furtherance of resolution of such incidents. As will be discussed in more detail hereafter, the RFS 160 may be configured to use the historical information from the database 150 to establish a machine learning model capable of determining resolution action recommendations and providing such recommendations to the incident manager system 110. The RFS 160 may further be configured to use subsequent actions and action results to update and refine the machine learning model.

Figure 2:
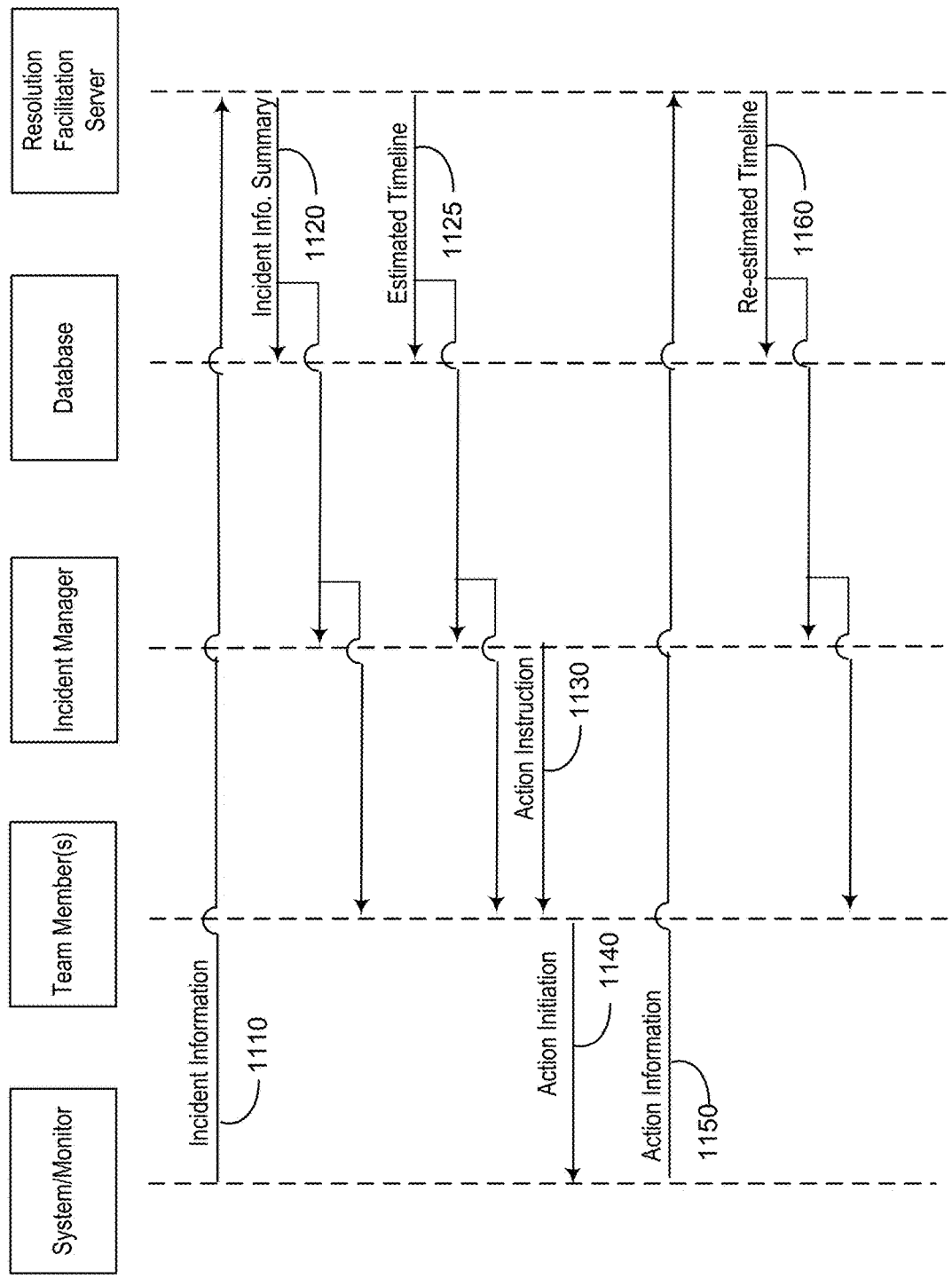
FIG. 2 is a sequence diagram illustrating a sequence of actions taken to provide and update an incident timeline for facilitating incident resolution according to an embodiment of the invention.

The sequence diagram of FIG. 2 illustrates a typical operation scenario for distributing information and implementing an action on the incident resolution system 100. In the illustrated scenario, a failure or unacceptable performance loss in the target system 10 has been identified by the system monitor 140. At 1110, incident information obtained by the system monitor 140 from the target system 10 is sent to the RFS 160. The incident information may include information regarding various operating parameters for the system 10 and/or specific parameters associated with the identified failure or performance loss. The information may include current operating parameters and/or past parameters and associated times at intervals surrounding the start of the incident. The RFS 160 may assemble the incident information into a usable form and, at 1120, send it to the incident manager and, in some embodiments, one or more team members. The RFS 160 may also establish an incident record in the database 150 that includes some or all of the incident information. The RFS 160 may also use the incident information to establish an initial timeline for the incident. In typical embodiments, the RFS 160 may establish an incident initiation time that may be used as a baseline time for use in determining the elapsed time of the resolution effort and for establishing the relative timing of data/information acquisition and actions taken in furtherance of resolution. According to various embodiments of the invention, the RFS 160 may also determine, based on historical information, a set of expected actions to be taken to resolve the incident. As will be discussed in more detail, this may be accomplished, at least in part, using a machine learning model constructed based on information for previous incidents stored in the database 150. The RFS 160 may also estimate the sequence and timing of each action and, again based on historical data for such actions, estimate the cumulative time involved in taking the actions. This information may then be used to construct an estimated timeline that includes known timing information up to the current time and estimated events and timing information extending from the current time up to an estimated time for resolution of the incident. Using the estimated timeline information, the RFS 160 may construct a graphical representation of the timing of key events (known and estimated) from incident initiation to the estimated incident resolution. The estimated timeline information (in textual form, graphic form, or both) may be sent to the incident manager and team members at 1125.

At 1130, the incident manager issues an instruction to one or more team members to initiate an action in furtherance of incident resolution. It will be understood that actions in furtherance of resolution may have widely different degrees of importance and that some may be deemed critical actions that may be identified, tracked and controlled. Critical actions may be common-place actions such as those necessary to establish the bridge call or to assure that necessary personnel are contacted. Critical actions may also include more significant actions taken to "fix the problem" (e.g., initiation of a reboot of a particular system component). Certain action types may be predetermined to be critical actions while others may be identified as critical actions by the incident manager. In some embodiments, critical actions may be identified based on analysis of prior incident history.

While the diagram in FIG. 2 shows the action instruction as being sent to one or more team members for execution or initiation, there may be instances where the action instruction is directed to other personnel or system components for direct action. For example, an action instruction may be sent by the incident manager directly to the resolution facilitation server. Such an action could be, for example, to request information or a predicted result for a proposed action. In some cases, the action may simply be to record the occurrence of a particular event (e.g., a critical event) and/or to identify and track a critical action.

At 1140, the one or more team members may initiate the requested action, e.g., by implementing a command to the target system or to the system monitor. At 1150, the system monitor may return action information to the resolution facilitation server. In some instances, this may be or include an update to the status and/or operating parameters of the target system. In general, the action information will include a time stamp associated with the initiation of the action. The RFS may assemble and analyze the received information and send some or all of the information (or a summary) to the incident manager and, in some embodiments, to one or more of the team members. The RFS may also use the results of the action and current system status information to determine an updated set of expected actions to be taken to resolve the incident, estimate the sequence and timing of these actions, and reconstruct the estimated timeline for resolution of the incident. The re-estimated timeline may be then sent to the incident manager and team members at 1160.

It will be understood that the actions 1130, 1140, 1150 and 1160 may be repeated throughout the incident resolution process to assure that the incident manager and other team members have access to an up-to-date resolution estimate.

Figure 3:
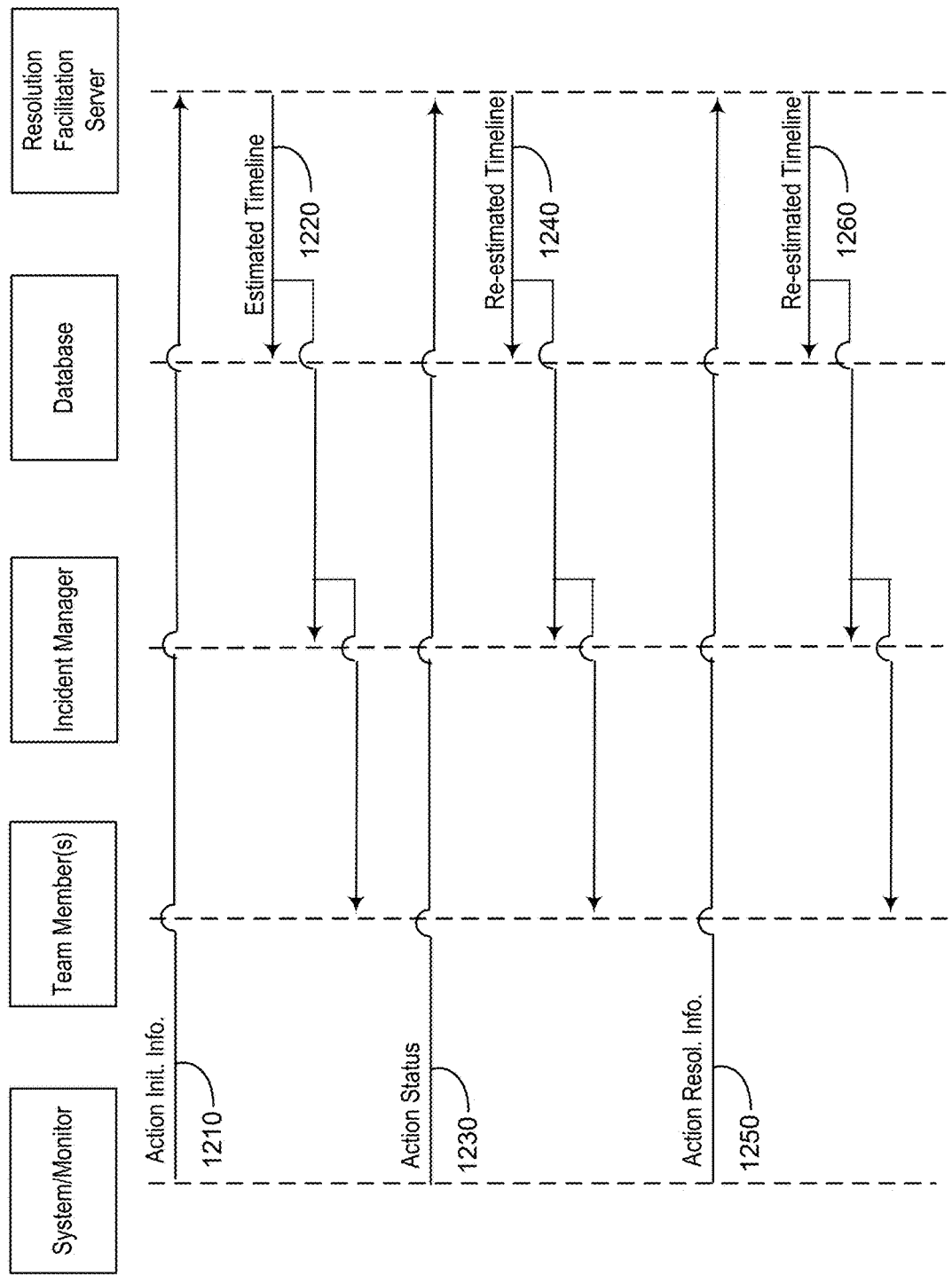
FIG. 3 is a sequence diagram illustrating a sequence of actions taken to provide and update an incident timeline for facilitating incident resolution according to an embodiment of the invention.

The sequence diagram of FIG. 3 illustrates a typical operation scenario for the system 100 in which an action has been initiated. In the illustrated scenario, the system monitor 140 provides, at 1210, target system action initiation information to the RFS 160. This information may include information on the action taken and system state information regarding various operating parameters for the system 10 and/or specific parameters associated with the identified failure or performance loss. The action information includes a time stamp associated with the initiation of the action. This could include, for example, the exact time at which a system or subsystem restart was enacted. The RFS 160 may assemble the incident information into a usable form and send it to the incident manager and, in some embodiments, one or more team members. The RFS 160 may also establish an incident record in the database 150 that includes some or all of the incident information. The RFS 160 may use the action information and historical data to determine an expected outcome of the action, including an expected time interval from initiation to resolution. Based on the expected outcome and additional historical information, the RFS 160 may determine, a set of expected actions to be taken to resolve the incident. This may be accomplished, at least in part, using a machine learning model constructed based on information for previous incidents stored in the database 150. The RFS 160 may also estimate the sequence and timing of each action and, again based on historical data for such actions, estimate the cumulative time involved in taking the actions. This information may then be used to construct an estimated timeline that includes known timing information up to the current time and estimated events and timing information extending from the current time up to an estimated time for resolution of the incident. Using the estimated timeline information, the RFS 160 may construct a graphical representation of the timing of key events (known and estimated) from incident initiation to the estimated incident resolution. The estimated timeline information (in textual form, graphic form, or both) may be sent to the incident manager and team members at 1220.

Depending on the nature and duration of an action, the scenario shown in FIG. 3 may include an action status communication 1230 from the system monitor 140 to the RFS 160. This may include updated information on system state parameters and/or updated information regarding the status of the actual action being implemented. The RFS 160 may use the action and system status information to determine an updated set of expected actions to be taken to resolve the incident, estimate the sequence and timing of these actions, and reconstruct the estimated timeline for resolution of the incident. The re-estimated timeline may be then sent to the incident manager and team members at 1240. In some embodiments, the RFS 160 may include with this timeline information an indication or warning that the total predicted duration of the action (i.e., time interval from initiation to expected resolution) exceeds an expected interval for the action based on historic data.

At 1250, the system monitor may return action resolution information to the resolution facilitation server. In some instances, this may be or include an update to the status and/or operating parameters of the target system. The action resolution information may include a time stamp associated with the resolution of the action. The RFS 160 may assemble and analyze the received information and send some or all of the information (or a summary) to the incident manager and, in some embodiments, to one or more of the team members. The RFS may also use the results of the action and current system status information to determine an updated set of expected actions to be taken to resolve the incident, estimate the sequence and timing of these actions, and reconstruct the estimated timeline for resolution of the incident. The re-estimated timeline may be then sent to the incident manager and team members at 1260.

The constituents of the incident resolution system 100 will now be discussed in more detail. The manager and team member processing systems 110, 120 may be or include any network-enabled processor computer system or device including, but not limited to, any server, network appliance, personal computer (PC), workstation, mobile processing device such as a smart phone, smart pad, handheld PC, or personal digital assistant (PDA), or card-mounted microprocessor capable of direct or indirect network communication. The network-enabled computer systems used to carry out the methods contemplated by the invention may execute one or more software applications to, for example, receive data as input from an entity accessing the network-enabled computer system, process received data, transmit data over a network, and receive data over a network. The network-enabled computer systems may also include one or more software applications to provide notifications to a user. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be or include a wireless network, a wired network or any combination of wireless network and wired network, and may be configured to connect the incident manager data processing system 110 and the incident team member data processing systems 120 to each other and to the other system components. The network 130 may, for example, include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network 130 may include, without limitation, telephone lines, fiber optics, IEEE Ethernet 902.3, a wide area network (WAN), a wireless personal area network, a local area network (LAN), or a global network such as the Internet. In addition, the network 130 may support an Internet network, a wireless communication network, a cellular network, or the like, or any combination thereof. The network 130 may further include one network, or any number of the exemplary types of networks mentioned above, operating as a stand-alone network or in cooperation with each other. The network 130 may utilize one or more protocols of one or more network elements to which they are communicatively coupled. The network 130 may translate to or from other protocols to one or more protocols of network devices. Although the network 130 is depicted as a single network, it should be appreciated that according to one or more examples, the network 130 may comprise a plurality of interconnected networks, such as, for example, the Internet, a service provider's network, a cable television network, corporate networks, such as credit card association networks, and home networks.

Figure 4:
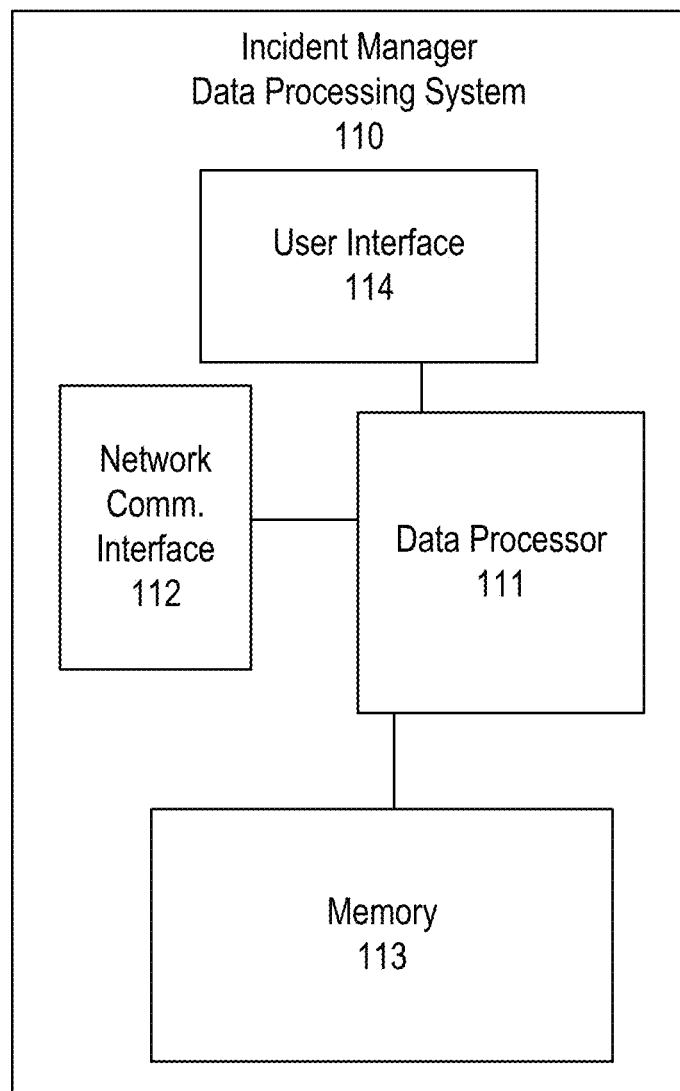
FIG. 4 is a schematic representation of an incident manager data processing system usable in implementing embodiments of the invention.

With reference to FIG. 4, the incident manager data processing system 110 may be or include any network-enabled data processing and/or communication device including, but not limited to a smartphone, a laptop, a desktop computer, and a tablet. In particular embodiments, the manager data processing system 110 includes an on-board data processor 111 in communication with a memory module 113, a user interface 114, and a communication interface 112. In some embodiments, the manager data processing system 110 may include an image capturing device (e.g., a digital camera) and/or an audio input/recording device. The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the device 110 can include one or more of these memories.

The user interface 114 may include one or more user input mechanisms, which can be any device for entering information and instructions into the manager data processing system 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays. In some embodiments, the user interface 114 may be configured to capture audio-visual communications between a user of the system 110 and users of other network-connected data processing systems (e.g., team member data processing systems 120).

The communication interface 112 is configured to establish and support wired or wireless data communication capability for connecting the device 110 to the network 130, or other communication network. The communication interface 112 can also be configured to support communication with a short-range wireless communication interface, such as near field communication (NFC), radio-frequency identification, and Bluetooth.

In embodiments of the invention, the memory 113 may have stored therein one or more applications usable by the data processor 111 to conduct and/or monitor exchanges with the RFS 160 and team member data processing systems 120. In particular, the memory may have stored therein an incident resolution facilitation application configured for monitoring communications from the system monitor and the RFS 160 and for receiving and displaying incident resolution information from the RFS 160. The application may also be configured for transmitting action instructions, tracking action initiation and resolution, and receiving action result information. The application may further be configured for constructing an action recommendation request, transmitting such a request to the RFS 160 and receiving from the RFS 160 an action recommendation. The application may also be configured for presenting the action recommendation to the user (e.g., an incident manager), for receiving recommendation response information from the user, and for transmitting a recommendation response to the RFS 160.

In some embodiments, the resolution facilitation application may be configured to receive and interpret audio instructions from the user of the manager data processing system 110. In particular, the application may be configured to recognize a particular audio cue to indicate that an audio instruction will follow, receive and interpret the subsequent audio instruction, and then take action in accordance with the instruction. For example, during an application-monitored bridge call, the incident manager may determine that an action recommendation should be requested. The incident manager may then verbalize the audio cue and audibly request that an action request be sent to the RFS 160 without otherwise interrupting the call. The application would then construct and transmit the request to the RFS 160. Other examples could include instructions to note the occurrence of events, instructions to identify and track critical actions, or evaluate a hypothetical action.

The resolution facilitation application may be configured to receive from the RFS 160 and display, via the user interface 114, information relating to incident resolution. This may include updates to target system status, information on actions taken and (if applicable) the results of such actions, resource availability, etc. The application may, in particular, be configured to receive and display incident resolution timeline information. This may include a graphic presentation of the timing of actual resolution events, projected/estimated events, or both.

Like the incident manager data processing system 110, the team member data processing systems 120 may be or include any network-enabled data processing and/or communication device including, but not limited to a smartphone, a laptop, a desktop computer, and a tablet. The team member data processing systems 120 would also have a data processor, memory, a user interface and a communication interface. The memory of the team member data processing systems 120 may also have an incident resolution facilitation application stored therein, which, in some embodiments, may have lesser functionality than is provided to the manager system 110. The team member system application may, for example, be configured for receiving and displaying information received from the RFS 160 and for tracking communications and actions involving a particular team member system 120. The application may, in particular, be configured to receive and display incident resolution timeline information in a manner similar to the manager data processing system 110.

The system monitor 140 may be any combination of a network-enabled processor and software configured to monitor the target system 10 or a particular software application operating thereon to determine operating status and identify and track the occurrence of an incident thereon or associated therewith. The system monitor 140 may track operating parameters and at regular intervals and/or upon command provide incident information to the RFS 160 and/or other system components/actors.

The incident information database 150 is or includes one or more data storage units having stored therein searchable historical data records for enterprise system incident and incident resolution efforts. These data records may include information for incidents occurring on the target system 10 and/or other incident-stricken systems. For each incident, the recorded information may include, without limitation, time-based information on the nature and characteristics of the incident, the state of the stricken system, resources available and resources used to resolve the incident, critical actions taken in furtherance of incident resolution and information on the results of each such action, and external conditions affecting incident causes or resolution. In particular embodiments, critical actions may be categorized according to action type, resources required, relative effectiveness, etc. Resource information in the database may include information on individuals who participated in the resolution effort, including information on the time worked and quantitative and/or qualitative performance measures for each individual. In some embodiments, common critical actions may be pre-defined or fall into pre-defined categories. Information included for each critical action may include timing information including, but not limited to initiation and resolution timing (relative to incident start). Stored incident information may also include audio and/or video recordings of communications between resolution team members.

Figure 5:
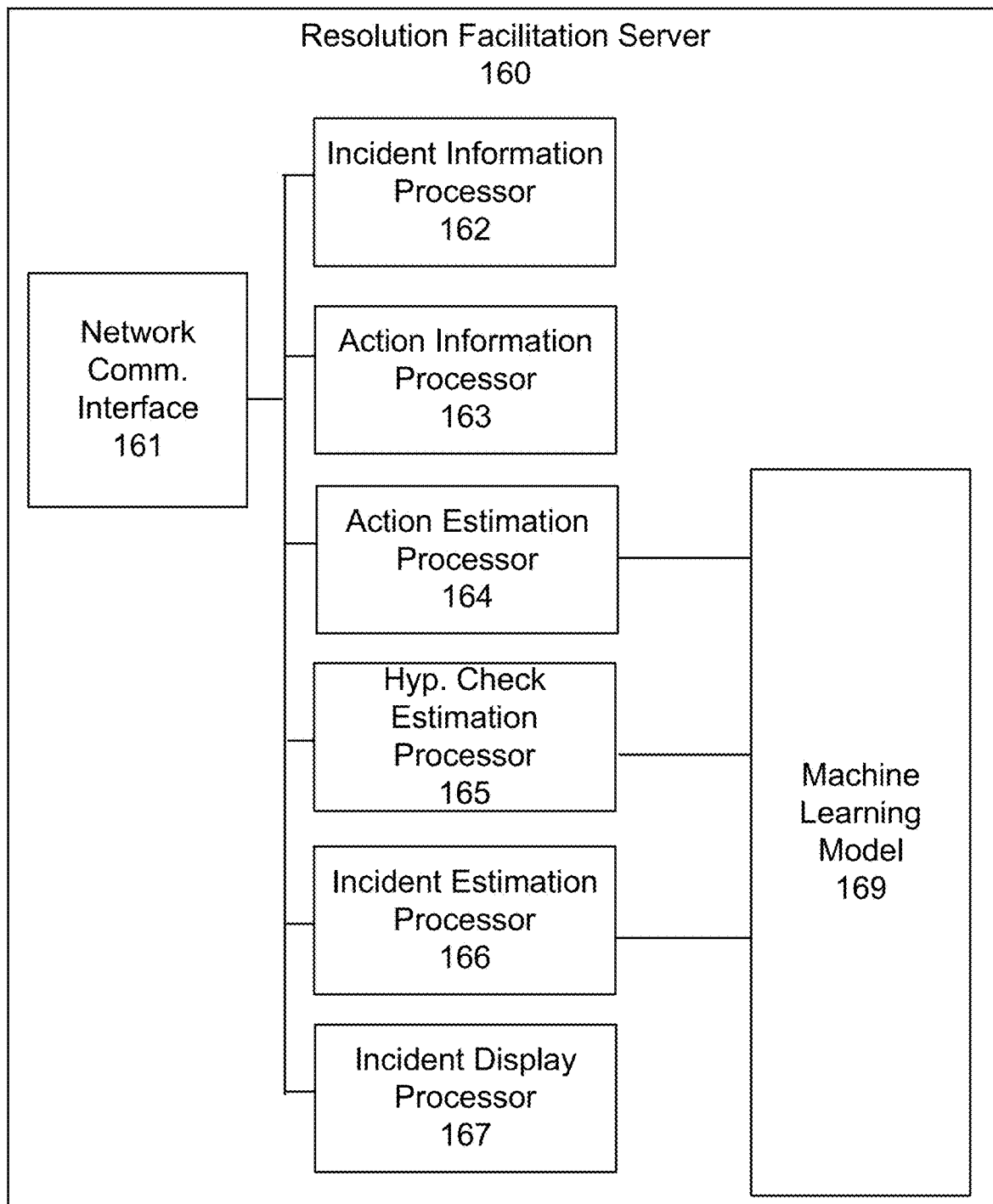
FIG. 5 is a schematic representation of a resolution facilitation server according to an embodiment of the invention.

The RFS 160 may include one or more network-enabled data processing systems configured for communication with each other and with other components of the incident resolution system 100 via the network 130 or other networks. With reference to FIG. 5, the RFS 160 may, in particular, include a network communication interface 161 in communication with an incident information processor 162, an action information processor 163, an action estimation processor 164, and an incident estimation processor 166. In some embodiments, the RFS 160 may also include a hypothesis check estimation processor 165 and/or an incident display processor 167. It will be understood that some or all of the functions of any of the component processors of the RFS 160 may be consolidated or spread amongst multiple data processing systems.

The incident information processor 162 may be an automated data processor configured to receive incident information from any one or more of the system monitor 140, incident manager data processing system 110, and the team member data processing systems 120. The incident information processor 162 may, in particular, be configured to receive incident and system operating parameter information for the target system 10 from the system monitor 140. The incident information processor 162 may be further configured to assemble and analyze this information and compare it to information on previous incidents to classify and summarize the primary characteristics of the incident and potential impacts on other systems and applications. The incident information processor 162 may also be configured to summarize key information regarding the incident in a graphic format (e.g., as an incident dashboard) and transmit it or make it available to the incident manager data processing system 110 and appropriate team member data processing systems 120. The incident information processor 162 may be configured to update the graphic incident summary display on a continuous or periodic basis or upon identifying a change to any significant information presented therein. The graphic display may include, without limitation, target system status information, information regarding pending or implemented critical actions, and other information identified by the incident manager as significant.

The incident information processor 162 may be configured for receiving and storing via the network communication interface 161 time-based incident information for the incident in the incident information database 150. This may include some or all of the information received from the system monitor 140 and information received from any system component regarding critical events or actions. Such information may include, for example, the actions taken to identify and contact personnel for the incident resolution team and tracking of participation and actions by the identified personnel.

The incident information processor 162 may be configured to monitor and record in the incident information database 150 audio-visual and other communications between and among the incident manager and team member processing systems 110, 120, the system monitor 140, and the RFS 160. In some embodiments, the incident information processor 162 may have stored therein a communication interpretation application configured to process and interpret textual and/or verbal communications of the incident manager. Such communications may include those directed to the incident information processor 162 as well as those directed to other system resources, including resolution team members. The application may be configured to apply natural language interpretation applications to interpret comments and identify action information. This may include identifying key words and/or predefined cues associated with predefined critical actions. The application may be further configured to, upon identifying such critical actions, extract related action information and transmit it to the action information processor 163.

In some embodiments, the incident information processor 162 may be configured to receive information from other sources that could affect team activities or system performance. For example, the processor 162 may access information on personnel and system resource availability. Any or all such information may be stored in the incident information database 150 so that its impact may be incorporated into models for identifying resolution actions in the future. The information may also be summarized and transmitted to the incident manager and/or team member processing systems 110, 120.

The incident information processor 162 may be configured to construct a graphic dashboard that can be accessed by the incident manager and team member processing systems 110, 120. The dashboard may be configured to conveniently present current incident status information as well as information regarding critical actions that have been taken in furtherance of incident resolution.

The action information processor 163 may be an automated data processor configured for receiving via the network communication interface 161 action information regarding critical actions taken in furtherance of incident resolution. The action information may be received from the manager data processing system 110 or any of the team member data processing systems 120. As noted above, action information may also, in some embodiments, be received from the incident information processor 162. In typical embodiments, critical actions may be identified as such by the incident manager, or instructions to take a critical action may be sent by the incident manager to the appropriate personnel or system. In some instances, the incident manager may have updated information on a previously initiated action. In any of these instances, action information may be received by the action information processor 163 from the incident manager processing system 110 or the incident information processor 162. The action information may include an action type, a time stamp, and a description. If the action information relates to a newly identified or initiated action, the incident processing manager may assign an action-unique identifier to assist in tracking and evaluating the resolution of the action. Action information for a previously identified or initiated action may include the previously assigned action-unique identifier. Such information may also include a status of the action and other information relating to the effect of the action. In some instances, the action information may include an indication of a final resolution of the action.

In some embodiments, the action information processor 163 may be configured to monitor communication to and from the incident manager data processing system 110 and to identify natural language comments and communications entered by the incident manager. The processor 163 may be further configured to apply a natural language processing application to the natural language comments and parse the comments to identify action information. This could include, for example, identification of the initiation of a particular critical action or a description of the outcome of an action or hypothesis check. In some embodiments, the action information processor 163 may be configured to use a machine learning model to identify and extract critical action information from natural language comments.

In some embodiments, the action information processor 163 may be configured to store action information for critical actions in the incident information database 150. In other embodiments, the action information processor 163 may be configured to send the action information to the incident information processor 162 for processing and/or storage in the incident information database. In either case, the action information processor 163 may be configured to determine if a particular action is a pre-defined critical action or falls within a predefined action category. Action information stored in the incident information database 150 may include action identification, times associated with initiation and, if applicable, resolution, and, in some embodiments, a score of the relative effectiveness of the action. Action information may also include the resources used in furtherance of the action and, if not otherwise available in the database, the resources available for use at the time the action was initiated.

In some embodiments, the action information processor 163 may be configured to identify actions that are not among pre-defined critical action types and that have no direct analog actions in the incident information database 150.

Such actions may be identified by the action information processor 163 as actual (if already initiated) or candidate (if proposed but not yet initiated) hypothesis checks. As with critical actions, initiated hypothesis check information may be stored in the database 150. Such information may include action identification, times associated with initiation and, if applicable, resolution, and, in some embodiments, a score of the hypothesis.

Upon initiation of a hypothesis check, the incident manager may notify the action information processor 163 of the action. The notification itself may identify the action as a hypothesis check. In some embodiments, however, the action information processor 163 may be configured to compare the attributes of any action to previously defined actions (or to some or all previous actions in the incident information database 150) to determine if the action meets criteria for identification as a hypothesis check. In either case, once an action is identified as a hypothesis check, the processor 163 may include that identification in subsequent communications and information summaries.

The action estimation processor 164 may be an automated data processor configured for receiving and transmitting communications via the network communication interface 161. The action estimation processor 164 is configured to receive information about an initiated or proposed action and, using current incident information (including target system state information), determine an estimate of the time required for the action to be resolved (i.e., produce a tangible result). This may be accomplished by comparing the action to previous actions for which information is stored in the incident information database 150. The action estimation processor 164 may be provided with criteria for establishing action, incident, and target system similarity that may be used to establish comparable actions. Statistical analysis of such actions may then be used to provide an expected duration between action initiation and action resolution. In some embodiments, an expected outcome may also be determined. The expected duration and action initiation timing information may then be provided to the incident estimation processor 166.

In some embodiments, the action information processor 163 and the action estimation processor 164 may be collectively configured to track the progress of an on-going action and to update and compare its estimated duration to an expected duration statistically determined for similar actions in the incident database. In cases where the time-to-resolve the action exceeds the statistically expected duration or is predicted to exceed the statically expected duration, the action estimation processor 164 may transmit a warning to the incident manager processing system 110 and/or one or more of the team member processing systems 120 (e.g., the system(s) 120 associated with an action responsible team member).

In some embodiments, the RFS 160 may include a hypothesis check estimation processor 165. The function of the hypothesis check estimation processor 165 may be similar to that of the action estimation processor 164. Hypothesis checks, however, by virtue of their inherent novelty relative to previous actions, may require different criteria for identifying actions in the incident information database 150 that can be used to make a statistical estimate of their likely outcome and duration. In some instances, a hypothesized action may involve a significant amount of time and resources and the hypothesized outcome is uncertain. There may also be the possibility that the action, while novel in some respects, may have similarities to previously implemented actions documented in the incident information database 150. Accordingly, in some embodiments of the invention, the hypothesis check estimation processor 165 may be configured to use historical incident data and the machine learning model 169 to determine an expected outcome and duration of the hypothesized action. The resulting expected duration information may be provided to the incident estimation processor 166. In addition to obtaining these estimates, the hypothesis check estimation processor 165 may also be configured to establish a relative confidence level in the determined estimates. The processor 165 may further be configured to transmit an alert to the incident manager if the confidence level is below a predetermined threshold value.

The incident estimation processor 166 may be an automated data processor configured for receiving and transmitting communications via the network communication interface 161. The incident estimation processor 166 may be configured to, periodically, continually, or upon demand, update timeline information for the incident resolution project. The timeline information may include actual time of occurrence information for events that have already occurred. It may also include estimated times of occurrence for expected future events, including expected action initiation and resolution events. Timeline information may also include an estimate of the incident end time (i.e., the expected time at which the incident is resolved). To accomplish this, the incident estimation processor 166 is configured to receive initiation timing and estimated duration information on all critical actions and hypothesis checks that have been initiated or scheduled. This information can be used to determine an estimated time of completion of all currently ongoing actions.

In order to obtain an overall estimate of the remaining time to resolution of the incident, the incident estimation processor 166 may require information on expected additional actions that will be taken in order to achieve resolution. The incident estimation processor 166 may be configured to use a machine learning-based incident resolution model 169 to identify the expected additional events using the current incident information, the expected outcomes of the ongoing actions, available resolution resources and historical information on previous incident s from the incident information database 150.

As previously discussed, the incident information database 150 comprises historical records regarding prior system incidents and their resolution. This information may be fed to the machine learning model 169 on a continuous or periodic basis or, in some embodiments, upon request or upon submission of new information to the database 150. The incident information from the incident database 150 may be used to train the machine learning model 169 to identify and establish the requirement for and/or the likely implementation of predefined actions. Using current incident state and resource information, the machine learning model 169 may be used to simulate the likely effect of thousands of potential actions. In doing so, the model 169 would account for similarities and differences between current and prior incident characteristics and available resources. The model 169 may also take into account instances of previous action predictions made during both current and prior incident resolution efforts. Feedback on the relative success of such predictions may be provided to refine the model.

The machine learning model 169 may be configured to determine an outcome state for each possible action given the current state of the system 10. The model 169 may be configured to, based on the historical incident information and current state parameters for the system 10 and using statistical weighting values, establish a relative confidence level and/or a score reflecting a degree of likelihood of an action and the expected outcome state. In some embodiments, a predefined potential action may have one or more associated parameters that can be used to establish a relative degree of effectiveness of the action In exemplary embodiments, the machine learning model 169 may be an unsupervised learning model that makes use of any of various known algorithms. The exemplary model can utilize various neural networks, such as convolutional neural networks ("CNN") or recurrent neural networks ("RNN") to generate the machine learning model. In exemplary embodiments, a CNN can include one or more convolutional layers (e.g., often with a subsampling step), followed by one or more fully connected layers as in a standard multilayer neural network. CNNs can utilize local connections, and can have tied weights followed by some form of pooling which can result in translation invariant features.

RNNs are a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. RNNs may include two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The incident estimation processor 166 may use the machine learning model 169 to identify a likely sequence of actions that will be taken to obtain resolution of the incident. This may include identification of actions taken in parallel and actions that would be taken in a sequential order. Using the expected timing and duration of these actions, the processor 166 may be configured to identify an expected timeline of events leading to a final incident resolution. The expected time to resolution may be determined by adding the durations of the expected actions (accounting for overlap of parallel actions). In some embodiments, the processor 166 may compare this result to an overall statistical analysis of similar incident duration information to assess the reasonableness of the estimated time to resolution.

The RFS 160 may include an incident display processor 167 configured for constructing a graphical representation of timeline information. This graphical timeline may be constructed to provide a clear, straightforward summary of the timing of critical events and actions taken during an incident resolution effort. In some embodiments, the graphical timeline may be configured for display along with or as part of an incident dashboard configured to track communications and display other incident status information. The incident display processor 167 may be an automated data processor configured for receiving and transmitting communications via the network communication interface 161, for receiving incident and action information from the incident information processor 162 and the action information processor 163, and for receiving estimation information from the action estimation processor 164, the hypothesis check estimation processor 165, and the incident estimation processor 166. In each of the foregoing, the information received would include identification of the event or action and timing of the event or action including, if applicable, an initiation time and an actual or estimated duration or completion time. The incident display processor 167 may be further configured to identify particular events and critical actions to be included in the graphical timeline. In some embodiments, such identification may be based on predetermined default criteria. For example, the default criteria may be or include a list of particular event and action types. In some embodiments, the processor 167 may be configured to present timeline display options to a user (e.g., on the incident manager processor system 110 or a team member processing system 120) and receive a response including instructions indicating particular display criteria. Such instructions could include, for example, a request to display only completed actions and events (i.e., no currently on-going or estimated actions). The instructions could also indicate a particular segment of time for which the timeline is to be presented.

The graphical timeline may be constructed to illustrate a sequence of events in the form of one or more branching horizontal lines. In its simplest form, the timeline may depict events as symbols along a single, primary event line 200 as shown in the exemplary illustrations of FIGS. 6 and 7. The event line 200 extends from an incident start time on the left to an estimated incident resolution (end) time on the right. The current time is indicated by a chevron near the center of the event line 200. In this example, the color of the line prior to the current time is different from that to the current time. The timing of significant events are represented by circles spaced apart by distances proportionate to their spacing in time. Uncompleted or estimated action events (e.g., action initiation and action completion) are represented by squares.

Figure 6:
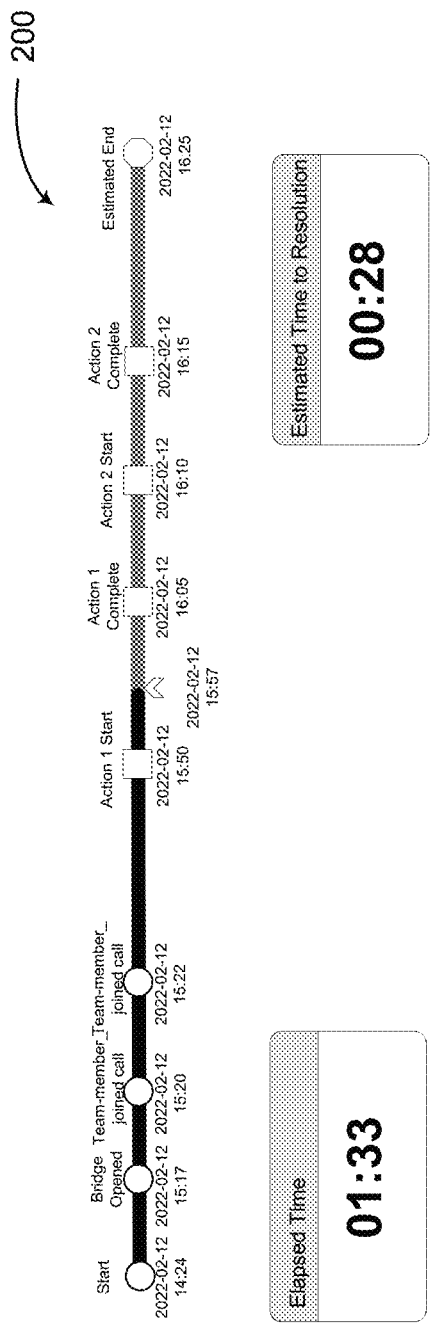
FIG. 6 illustrates an exemplary graphic representation of an incident resolution timeline according to an embodiment of the invention.

It will be understood that FIG. 6 illustrates the timeline at a first time (15:57) at which a critical action (Action 1) has been initiated, but not completed. In constructing this timeline, the incident display processor 167 uses information from the action estimation processor to establish an estimated Action 1 complete time. It also used information from the incident estimation processor 166 and/or the action estimation processor 164 to identify an expected additional action (Action 2) and to determine estimated initiation and completion times to allow positioning of the associated event symbols along the line 200. The processor 167 also used information from the incident estimation processor 166 to establish an estimated time of resolution (16:25) for the incident. In this example, the incident display processor 167 is configured to also include a display of the elapsed time since the incident start and the estimated time to resolution.

Figure 7:
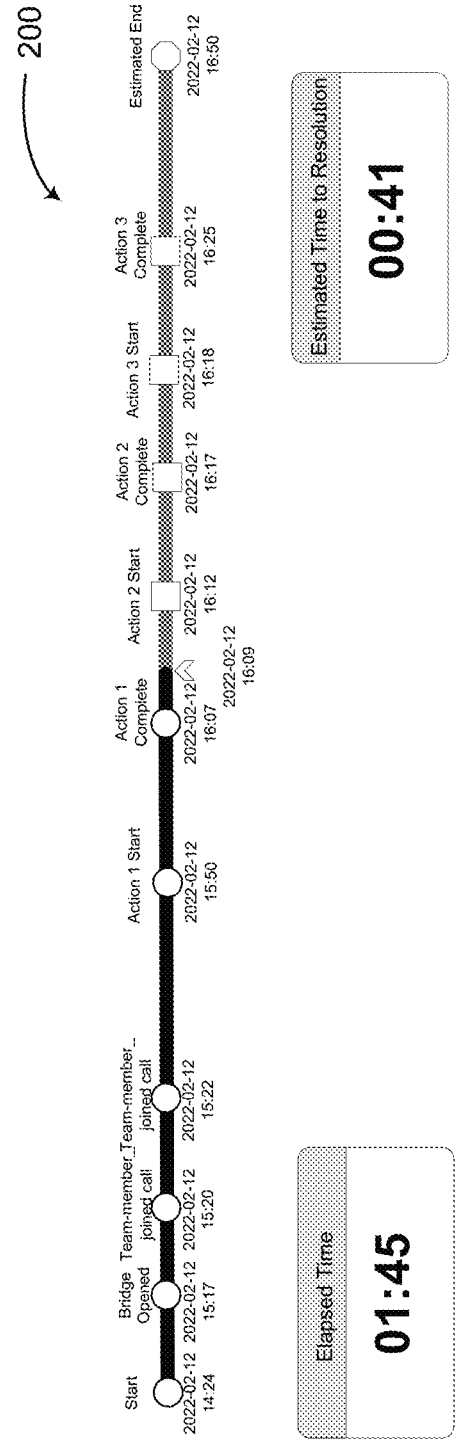
FIG. 7 illustrates an exemplary graphic representation of an incident resolution timeline according to an embodiment of the invention.

FIG. 7 illustrates the same timeline 200 at a second time (16:09). At this time, Action 1 has been resolved, and, as the result of updated state information, the RFS 160 has made changes to the actions expected to occur. The updated timeline 200 accordingly includes times associated with both Action 2 and a new expected action (Action 3) and the estimated end time has been extended.

Figure 8:
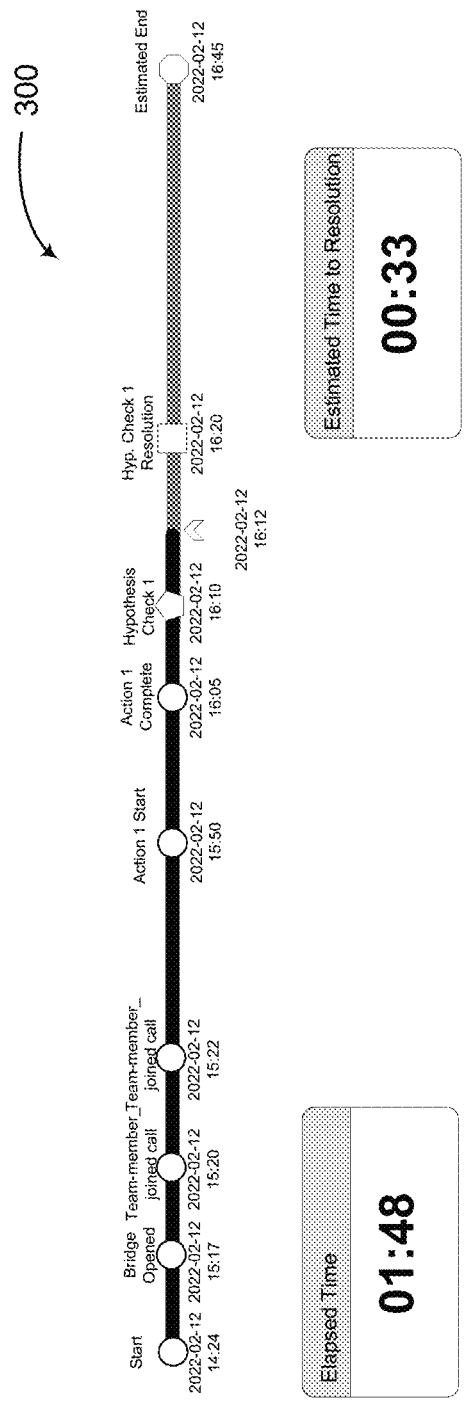
FIG. 8 illustrates an exemplary graphic representation of an incident resolution timeline according to an embodiment of the invention.

FIG. 8 illustrates another exemplary timeline 300 depicted at a first time 16:12, at which time hypothesis check (Hypothesis Check 1, symbolized by a pentagon) has been initiated, but not resolved. To construct this representation, the incident display processor 167 has used information from the hypothesis check estimation processor 165 to establish the location on the timeline 300 of the estimated resolution of Hypothesis Check 1. The processor 167 again uses information from the incident estimation processor 166 to establish the estimated end time for the incident resolution effort.

Figure 9:
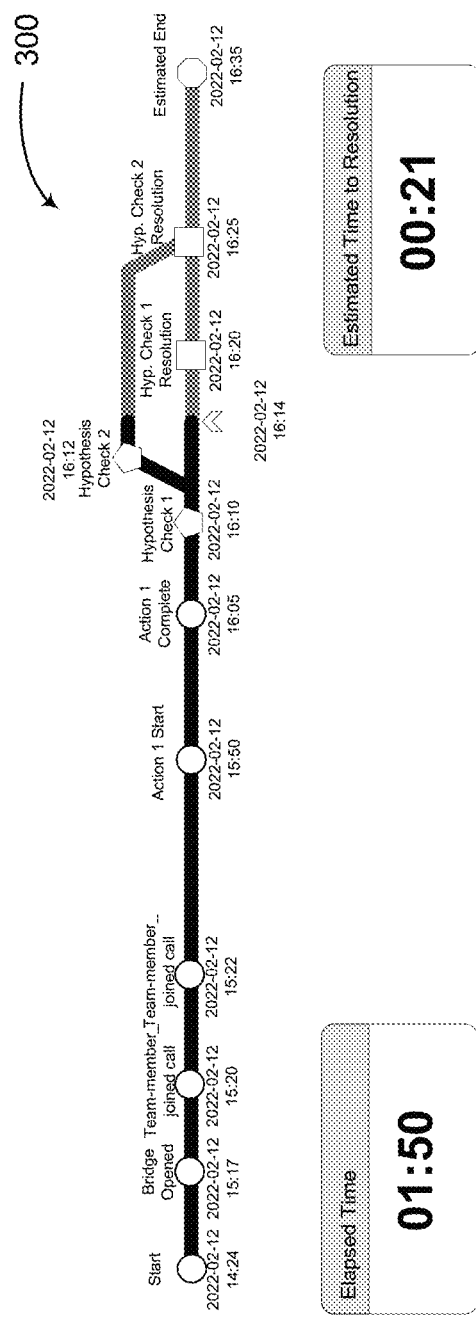
FIG. 9 illustrates an exemplary graphic representation of an incident resolution timeline according to an embodiment of the invention.

FIG. 9 illustrates the same timeline 300 at a second time (16:14). At this time, Hypothesis Check 1 has yet to be resolved, but a new hypothesis check (Hypothesis Check 2) has been initiated. In this particular embodiment, the incident display processor 167 is configured to illustrate a second parallel line associated with Hypothesis Check 2. Information from the hypothesis check estimation processor 165 has been used to determine estimated resolution times/line locations for both hypothesis checks. In this case, information from the incident estimation processor has been used to determine that the estimated time to resolution has been shortened based on expected outcomes of the two hypothesis checks.

In some embodiments, the incident display processor 167 may be configured to incorporate additional information in the graphical timeline representation. For example, in embodiments in which the RFS is configured to track action progress and determine if an action's estimated duration exceeds an statistically expected duration for the action, the incident display processor may be configured to change the color (e.g., from green to yellow) of the portion of the timeline extending from the action initiation symbol. If the estimated duration exceeds the expected duration by a wider than acceptable margin, a third color (e.g., red) could be used. Color coding could also be used to indicate other factors such as the relative confidence of a predicted outcome or time.

Figure 10:
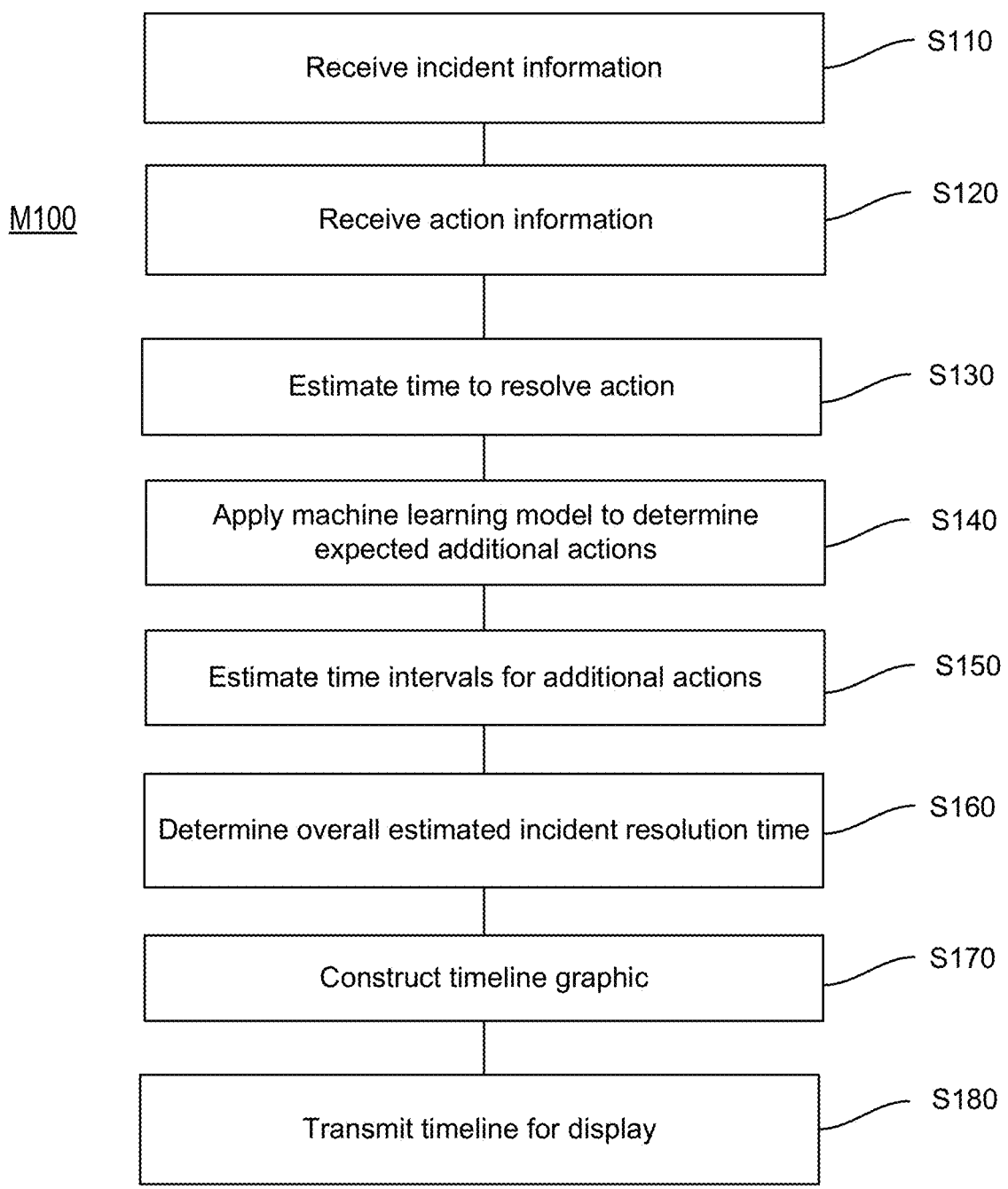
FIG. 10 is a flow chart of actions in a method of facilitating incident resolution according to an embodiment of the invention.

FIG. 10 illustrates a method M100 of facilitating resolution of an incident in or on a target data processing system according to an illustrative embodiment of the invention. While the method M100 will be described in the context of system 100 of FIG. 1, it will be understood that the method M100 may be implemented on other incident resolution arrangements as well. At S110 of the method M100, information regarding a new incident is received by the incident resolution system. Such information may, in particular, be received by an incident information processor of a resolution facilitation server. The incident information may be or include information received from an automated monitoring system in communication with the target system. The information can include status information on one or more operating parameters of the target system. The incident information may also include information from an incident manager, incident resolution team members, and other sources. The incident information processor may assemble and process the incident information for presentation to team members and for storage in the incident information database.

At S120, information about an action taken to further resolution of the incident may be received by an action information processor of the RFS from an incident manager or team member data processing system. The action information may include an action type, a time stamp, and a description. In some embodiments, the action information may be received from the incident information processor. In some embodiments, the RFS may be configured to monitor communication to and from a particular data processing system. In such embodiments, the action of receiving action information may include monitoring such communications for natural language comments and communications entered by the user (e.g., the incident manager), applying a natural language processing application to the natural language comments, and parsing the comments to identify information about critical actions. This could include, for example, indications of the initiation of a particular critical action or a description of the outcome of an action or hypothesis check. In some embodiments, the action of monitoring natural language comments may include recording and transcribing audible speech of the user. In some embodiments, a second machine learning model may be trained to identify and extract critical action information from natural language comments.

At S130, the RFS may use the action information and current system state information to estimate the time it will take to resolve the action. This may be accomplished by an action estimation processor of the RFS and may include comparing the action to previous actions for which information is stored in the incident information database. In some embodiments, the estimation action may include applying a statistical analysis of previous actions to obtain an expected duration of the current action. In some embodiments, an expected outcome may also be determined.

At S140, the RFS may use historical data and the expected outcome of the pending action to identify additional actions that are required or may be expected to be taken to resolve the incident. In particular embodiments, this may be accomplished by applying a machine learning model that has been constructed using the historical data for prior incidents. As previously described, the machine learning model may be trained using historical incident information previously stored in an incident database. The historical incident information may include information on critical actions taken during previous incidents along with coincident information on the afflicted processing systems and current state parameters therefor. The action information would include specific action details and results indicative of the effectiveness of each action.

At S150, the RFS may determine estimated time intervals for the additional actions identified at S140. At S160, the RFS uses information on the estimated resolution time of the pending action and the estimated durations of the additional actions to determine an overall estimate of the time it will take to resolve the incident. In doing so, the RFS may take into account that the sequence of additional events may include overlapping of such events with each other and/or with the pending action.

In some embodiments, the estimated times for the pending action, the expected additional actions, and the incident resolution time may be transmitted to the incident manager, authorized team members, and/or other authorized parties. In some embodiments, the time estimates may be used by the RFS to construct, at S170, a graphical representation of a timeline for events and actions taken during the incident resolution effort. This graphical timeline could be constructed in the manner previously described and have an appearance similar to the illustrations of FIGS. 6-9. At S180, the graphical timeline may be transmitted to the incident manager, team members, and other authorized personnel for display.

It will be understood that the actions at S130, S140, S150, S160, S170, and S180 may be conducted in response to receiving updated incident or action information. These actions may also be repeated on a periodic or continuous basis or in response to a request from the incident manager or other authorized requestor.

Figure 11:
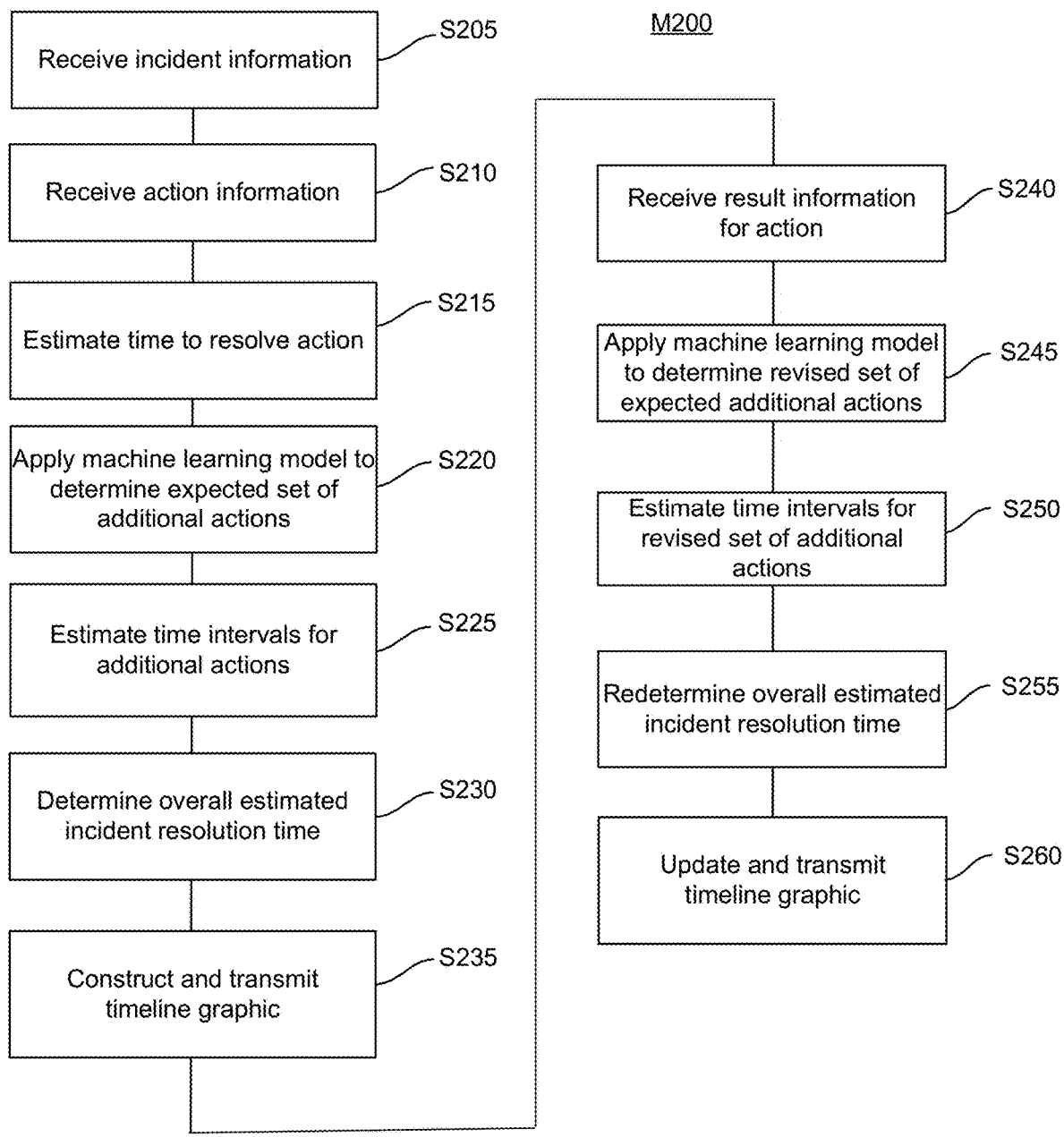
FIG. 11 is a flow chart of actions in a method of facilitating incident resolution according to an embodiment of the invention.

FIG. 11 illustrates a method M200 of facilitating resolution of an incident in or on a target system according to an illustrative embodiment of the invention. While the method M200 will be described in the context of system 100 of FIG. 1, it will be understood that the method M200 may be implemented on other incident resolution arrangements as well. At S205 of the method M200, information regarding an incident is received by the incident resolution system. Such information may, in particular, be received by an incident information processor of a resolution facilitation server. The incident information may be or include information received from an automated monitoring system in communication with the target system. The information can include status information on one or more operating parameters of the target system. The incident information may also include information from an incident manager, incident resolution team members, and other sources. The incident information processor may assemble and process the incident information for presentation to team members and for storage in the incident information database.

At S210, information about the initiation of an action taken to further resolution of the incident may be received by an action information processor of the RFS from an incident manager or team member data processing system. The action information may include an action type, an initiation time stamp, and a description. In some embodiments, the action information may be received from the incident information processor. At S215, the RFS may use the action information and current system state information to estimate the time it will take to resolve the action. This may be accomplished by an action estimation processor of the RFS and may include comparing the action to previous actions for which information is stored in the incident information database. In some embodiments, the estimation action may include applying a statistical analysis of previous actions to obtain an expected duration of the current action. In some embodiments, an expected outcome may also be determined.

At S220, the RFS may use historical data and the expected outcome of the pending action to identify additional actions that are required or may be expected to be taken to resolve the incident. In particular embodiments, this may be accomplished by applying a machine learning model that has been constructed using the historical data for prior incidents. As previously described, the machine learning model may be trained using historical incident information previously stored in an incident database. The historical incident information may include information on critical actions taken during previous incidents along with coincident information on the afflicted processing systems and current state parameters therefor. The action information would include specific action details and results indicative of the effectiveness of each action.

At S225, the RFS may determine estimated time intervals for the additional actions identified at S220. At S230, the RFS uses information on the estimated resolution time of the pending action and the estimated durations of the additional actions to determine an overall estimate of the time it will take to resolve the incident. In doing so, the RFS may take into account that the sequence of additional events may include overlapping of such events with each other and/or with the pending action.

In some embodiments, the estimated times for the pending action, the expected additional actions, and the incident resolution time may be transmitted to the incident manager, authorized team members, and/or other authorized parties. In some embodiments, the time estimates may be used by the RFS at S235 to construct a graphical timeline for the incident and transmit it to the incident manager, team members, and other authorized personnel for display.

At S240, the RFS may receive information on the results/resolution of the action for which initiation information was received at S210. The result information may be received from the target system monitor, a team member processing system, or the incident manager processing system. In some embodiments, the action result information may be received from the incident information processor. The action result information may include a resolution time stamp and a quantitative and/or qualitative description of the effect of the action. In some embodiments, the action result information may include or accompany updated target system state information or other incident status information.

At S245, the RFS may use the actual outcome of the action, the current target system state, and the machine learning model to determine a revised set of additional actions that may be expected to be taken to resolve the incident. At S250, the RFS estimates the time intervals for the revised set of additional actions and, at S255, re-determines the overall estimated time to resolution of the incident. At S260, the RSS updates and transmits the graphic timeline.

Figure 12:
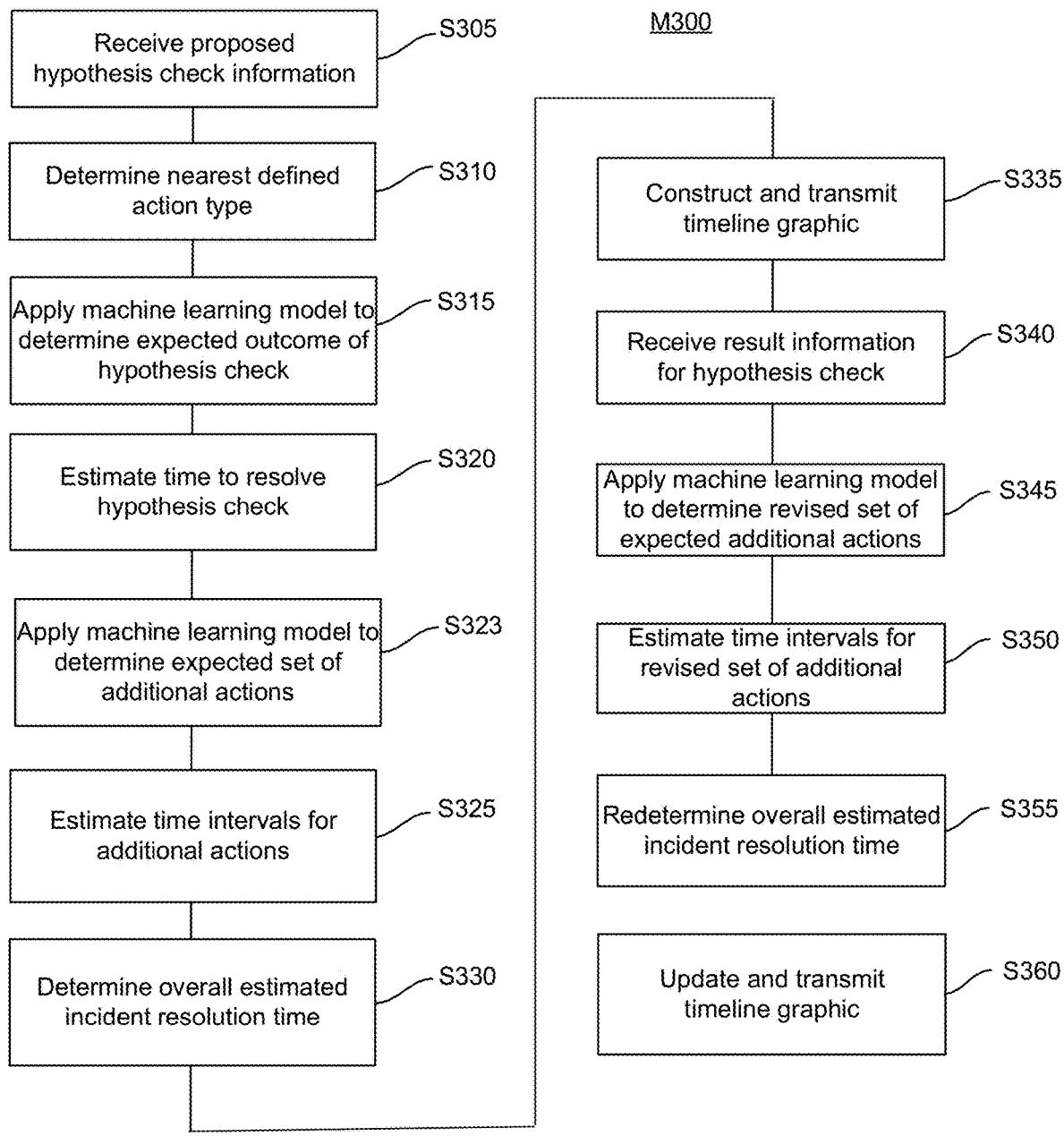
FIG. 12 is a flow chart of actions in a method of facilitating incident resolution according to an embodiment of the invention.

FIG. 12 illustrates a method M300 of facilitating resolution of an incident in or on a target system according to an illustrative embodiment of the invention. In this embodiment, the system receives information on a hypothesis check and estimates the effect of the hypothesis check on resolution of the incident. While the method M300 will be described in the context of system 100 of FIG. 1, it will be understood that the method M300 may be implemented on other incident resolution arrangements as well. At S305 of the method M300, information regarding the hypothesis check is received by the incident resolution system. Such information may, for example, be received by an action information processor or a hypothesis check estimation processor of a resolution facilitation server. The hypothesis check information may include an action identifier, an initiation time stamp, and a description of the action or actions taken to implement the hypothesis check. At S310, the hypothesis check information may be compared to information for some or all prior defined actions for which information is stored in the incident database to identify the action or actions that are most similar to the hypothesis check action. Using the machine learning model and information for previous instances of the nearest defined action(s), the RFS determines an expected outcome for the hypothesis check at S315. At S320, the RFS determines an estimated duration for the hypothesis check.

At S323, the RFS may use historical data and the expected outcome of the hypothesis check to identify additional actions that are required or may be expected to be taken to resolve the incident. In particular embodiments, this may be accomplished using the machine learning model trained using historical incident information previously stored in the incident information database. At S325, the RFS may determine estimated time intervals for the additional actions identified at S323. At S330, the RFS uses information on the estimated resolution time of the pending action and the estimated durations of the additional actions to determine an overall estimate of the time it will take to resolve the incident. In doing so, the RFS may take into account that the sequence of additional events may include overlapping of such events with each other and/or with the pending action. In some embodiments, the estimated times for the pending action, the expected additional actions, and the incident resolution time may be transmitted to the incident manager, authorized team members, and/or other authorized parties. In some embodiments, the time estimates may be used by the RFS at S335 to construct a graphical timeline for the incident and transmit it to the incident manager, team members, and other authorized personnel for display.

At S340, the RFS may receive information on the results/resolution of the hypothesis check. The result information may be received from the target system monitor, a team member processing system, or the incident manager processing system. In some embodiments, the hypothesis check result information may be received from the incident information processor. The result information may include a hypothesis check resolution time stamp and a quantitative and/or qualitative description of the effect of the hypothesis check. In some embodiments, the action result information may include or accompany updated target system state information or other incident status information. At S345, the RFS may use the actual outcome of the hypothesis check, the current target system state, and the machine learning model to determine a revised set of additional actions that may be expected to be taken to resolve the incident. At S350, the RFS may estimate the time intervals for the revised set of additional actions and, at S355, re-determine the overall estimated time to resolution of the incident. At S360, the RSS may update and transmit the graphic timeline.

The systems and methods of the invention provide a tool that improves the efficiency of both automated and human resources in resolving major enterprise system incidents by providing regular or continuous updates to incident status information, information on actions taken, information on actions expected to be taken, and the estimated time it will take to complete specific actions and/or resolve the incident. This is accomplished by using an automated process to monitor system and resource status and to use historical data to identify the actions likely to be taken to resolve the technical issues causing the incident. Embodiments of the invention can be used to focus incident managers on the right information and actions for resolution.

The present invention provides a method and system for authentication of symmetric encryption communications in which message authentication codes may be produced based on shared secret salt values that may be dynamically generated in parallel from a master key generated by a third party system. The result is more secure communication and construction of the shared data required for symmetric encryption communication.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated system for facilitating resolution of an incident occurring on a digital processing system, the automated system comprising:
an incident information data processor configured to
receive incident information about the incident from at least one of the set consisting of the digital processing system, a monitoring system in communication with the digital processing system, and a user data processing system,
an action estimation data processor configured to
receive critical action information for a critical action, the critical action information including a description of the action and an action initiation time,
obtain previous action information from a historical database of information on previous incidents, the previous action information including information on previous actions taken to resolve the previous incidents,
compare the critical action information for the critical action to the previous action information for the previous actions,
estimate a critical action time interval for resolution of the critical action based on the comparison of critical action information and previous action information,
determine an expected outcome of the critical action based on the comparison of critical action information and previous action information;
an incident estimation data processor configured to
apply a machine learning model to:
perform a hypothesis check on at least one novel additional action; and
determine one or more expected additional actions required to resolve the incident based on the incident information, the critical action, the historical database of information, the expected outcome of the critical action, and the hypothesis check;
estimate an additional action time interval for each of the one or more expected additional actions, and
estimate an overall time interval for incident resolution and an incident resolution time, wherein the estimated additional action time intervals for the one or more expected additional actions is used in determining the overall estimated time interval;

construct an estimated timeline of incident resolution based on the critical action and determined one or more expected additional actions, the estimated timeline including the estimated overall time interval for incident resolution, and a confidence score based on the determined action;

receive feedback comprising the results of at least one of the one or more expected additional actions and a current system status;

determine an updated set of expected actions for incident resolution;

estimate a sequence and a timing for the updated set of expected actions;

construct an updated estimated timeline of incident resolution based on the estimated timeline and the updated set of expected actions, the updated estimated timeline including the estimated sequence and timing for the updated set of expected actions; and an incident display data processor configured to transmit, to the user data processing system for display to a user, at least the estimated incident resolution time and the estimated timeline of incident resolution.

2. An automated system according to claim 1 wherein the incident information data processor is further configured to:

monitor network communications transmitted by the user data processing system for natural language user comments, apply a natural language processing application to the natural language user comments to identify user-supplied critical action information, and transmit the user-supplied critical action information to the action estimation data processor.

3. An automated system according to claim 2 wherein the incident information data processor is configured to record and transcribe audible speech of a user to produce the natural language user comments.

4. An automated system according to claim 1 wherein the critical action is one of a set of predetermined action types and the action to determine an estimated critical action time interval includes:

obtaining time interval information for previous occurrences of said one of the set of predetermined action types from the historical database, and determining the estimated critical action time interval based on said time interval information.

5. An automated system according to claim 1 wherein the incident display data processor is further configured to:

construct a graphical representation of an incident timeline indicating the action initiation time, the estimated critical action time interval, and the estimated incident resolution time, and transmit the graphical representation to a primary user data processing system for display on a visual display device thereof.

6. An automated system according to claim 5 wherein the incident display data processor is further configured to:

transmit the graphical representation to each of a plurality of user devices for display on a visual display device thereof.

7. An automated method of facilitating resolution of an incident occurring on a digital processing system, the method comprising:

receiving, by a resolution facilitation server, incident information for the incident;

receiving, by the resolution facilitation server, critical action information associated with a critical action taken to further resolution of the incident, the critical action having an expected outcome and the critical action information including an action initiation time;

determining, by the resolution facilitation server, the critical action from the critical action information;

comparing, by the resolution facilitation server, the critical action information for the critical action to historical information for previous similar actions, estimating, by the resolution facilitation server, a critical action time interval for resolution of the critical action based on the comparison of critical action information and previous action information;

determining, by the resolution facilitation server, an estimated critical action resolution time using the action initiation time and the estimated critical action time interval;

determining, by the resolution facilitation server, an expected outcome of the critical action based on the comparison of critical action information and previous action information;

applying, by the resolution facilitation server, a machine learning model to:

perform a hypothesis check on at least one novel additional action; and determine one or more expected additional actions required to resolve the incident based on the incident information, the critical action, the historical database of information, the expected outcome of the critical action, and the hypothesis check;

estimating, by the resolution facilitation server, an additional action time interval for each of the one or more expected additional actions;

estimating, by the resolution facilitation server, an overall time interval for incident resolution and an incident resolution time, wherein the estimated additional action time intervals for the one or more expected additional action is used in determining the overall estimated time interval;

constructing an estimated timeline of incident resolution based on the critical action and determined one or more expected additional actions, the estimated timeline including the estimated overall time interval for incident resolution, and a confidence score based on the determined action;

receiving feedback comprising the results of at least one of the one or more expected additional actions and a current system status;

determining an updated set of expected actions for incident resolution;

estimating a sequence and a timing for the updated set of expected actions;

constructing an updated estimated timeline of incident resolution based on the estimated timeline and the updated set of expected actions, the updated estimated timeline including the estimated sequence and timing for the updated set of expected actions; and transmitting, by the resolution facilitation server, at least the estimated incident resolution time and the estimated timeline of incident resolution to a user processing device for display to a user.

8. An automated method according to claim 7 further comprising:

receiving, by the resolution facilitation server, critical action resolution information including an action outcome and an action resolution time;

applying, by the resolution facilitation server, the machine learning model to update the one or more expected additional actions required to resolve the incident;

re-determining, by the resolution facilitation server, the estimated additional action time interval for each of the one or more expected additional actions;

re-determining, by the resolution facilitation server, an overall estimated time interval for incident resolution and the estimated incident resolution time, and transmitting, by the resolution facilitation server, at least the estimated incident resolution time to the user processing device for display to the user.

9. An automated method according to claim 8 further comprising:
receiving, by the resolution facilitation server, critical action status information including an action status and an action status time;
re-determining, by the resolution facilitation server, the estimated critical action time interval using the action status information;
determining, by the resolution facilitation server, a revised estimated critical action resolution time using the action initiation time and the re-determined estimated critical action time interval;
re-determining, by the resolution facilitation server, an overall estimated time interval for incident resolution and the estimated incident resolution time; and
transmitting, by the resolution facilitation server, at least the estimated incident resolution time to the user processing device for display to the user.

10. An automated method according to claim 9 further comprising:
comparing the revised estimated critical action resolution time to the estimated critical action resolution time; and
responsive to a determination that the revised estimated critical action time is later than the estimated critical action time, displaying a visual warning to the user.

11. An automated method according to claim 7 wherein the action of receiving critical action information includes:
monitoring natural language comments entered by the user;
applying a natural language processing application to the natural language comments; and
applying a second machine learning model to identify and extract the critical action information from the natural language comments.

12. An automated method according to claim 11 wherein the action of monitoring natural language comments includes recording and transcribing audible speech of the user.

13. An automated method according to claim 7 wherein the critical action is one of a set of predetermined action types and the action of determining an estimated critical action time interval is determined based on time interval information for previous occurrences of said one of the set of predetermined action types.

14. An automated method according to claim 7 wherein the critical action is of a new action type the action of determining an estimated critical action time interval includes:
determining a nearest analog to the new action type; and
determining the estimated critical action time interval using time interval information for previous occurrences of said nearest analog.

15. An automated method according to claim 7 wherein:
the critical action information includes identification of one or more actors responsible for carrying out the critical action, and
the historical information for previous similar actions includes performance information for the one or more actors.

16. An automated method according to claim 7 wherein the action of displaying at least the estimated incident resolution time to a user includes:
constructing a graphical representation of an incident timeline indicating the action initiation time, the estimated critical action resolution time, and the estimated incident resolution time; and
transmitting the graphical representation to each of a plurality of user devices for display on a visual display device thereof.

17. An automated system for facilitating resolution of an incident, the system comprising:
a primary user data processing system having a primary user interface device configured for presenting information to and receiving information from a primary user;
a plurality of secondary user data processing systems each having a secondary user interface device configured for presenting information to and receiving information from one of an associated one of a plurality of secondary users;
a data storage unit having stored therein a historical database of information on initiation and resolution of critical actions taken to further resolution of previous incidents;
an action estimation data processing system comprising:
an action estimation data processor configured to
receive critical action information for a critical action taken in furtherance of incident resolution, the critical action information including an action initiation time, and
compare the critical action information for the critical action to the information on initiation and resolution of critical actions taken to further resolution of previous incidents on the historical database,
estimate critical action time interval for resolution of the critical action based on the comparison of critical action information and previous action information;
an incident estimation data processor configured to
apply a machine learning model to:
perform a hypothesis check on at least one novel additional action; and
determine one or more expected additional actions required to resolve the incident based on the incident information, the critical action, the historical database of information, the expected outcome of the critical action, and the hypothesis check;
estimate an additional action time interval for each of the one or more expected additional actions, and
estimate an overall time interval for incident resolution and an incident resolution time, wherein the estimated additional action time intervals are used in the action to determine an overall estimated time interval,
construct a graphical representation of an estimated timeline of incident resolution timeline indicating the action initiation time, an estimated critical action resolution time, estimated resolution times for each of the one or more expected additional actions, and the estimated incident resolution time, and a confidence score based on the determined action;

receive feedback comprising the results of at least one of the one or more expected additional actions and a current system status;

determine an updated set of expected actions for incident resolution;

estimate a sequence and a timing for the updated set of expected actions; and an incident display data processor configured to transmit the graphical representation to each of the primary and secondary user data processing systems for display;

construct an updated estimated timeline of incident resolution based on the estimated timeline and the updated set of expected actions, the updated estimated timeline including the estimated sequence and timing for the updated set of expected actions; and transmit the updated estimated timeline to each of the primary and secondary user data processing systems for display.

18. An automated system according to claim 17 wherein the critical action is one of a set of predetermined action types and the action estimation data processor is configured to determine the estimated critical action time interval based on time interval information obtained from the historical database for previous occurrences of said one of the set of predetermined action types.

19. An automated system according to claim 17 wherein the incident display data processor is further configured to:

establish an estimated initiation time and an estimated completion time for each of the one or more expected additional actions, and the graphical representation displays the estimated initiation time and the estimated completion time for each of the one or more expected additional actions.

20. An automated system according to claim 17 wherein the incident estimation data processor is further configured to apply the machine learning model to determine an outcome state for each of the one or more expected additional actions based on a current state of the automated system.

* * * * *